(No Model.) 2 Sheets—Sheet 2.

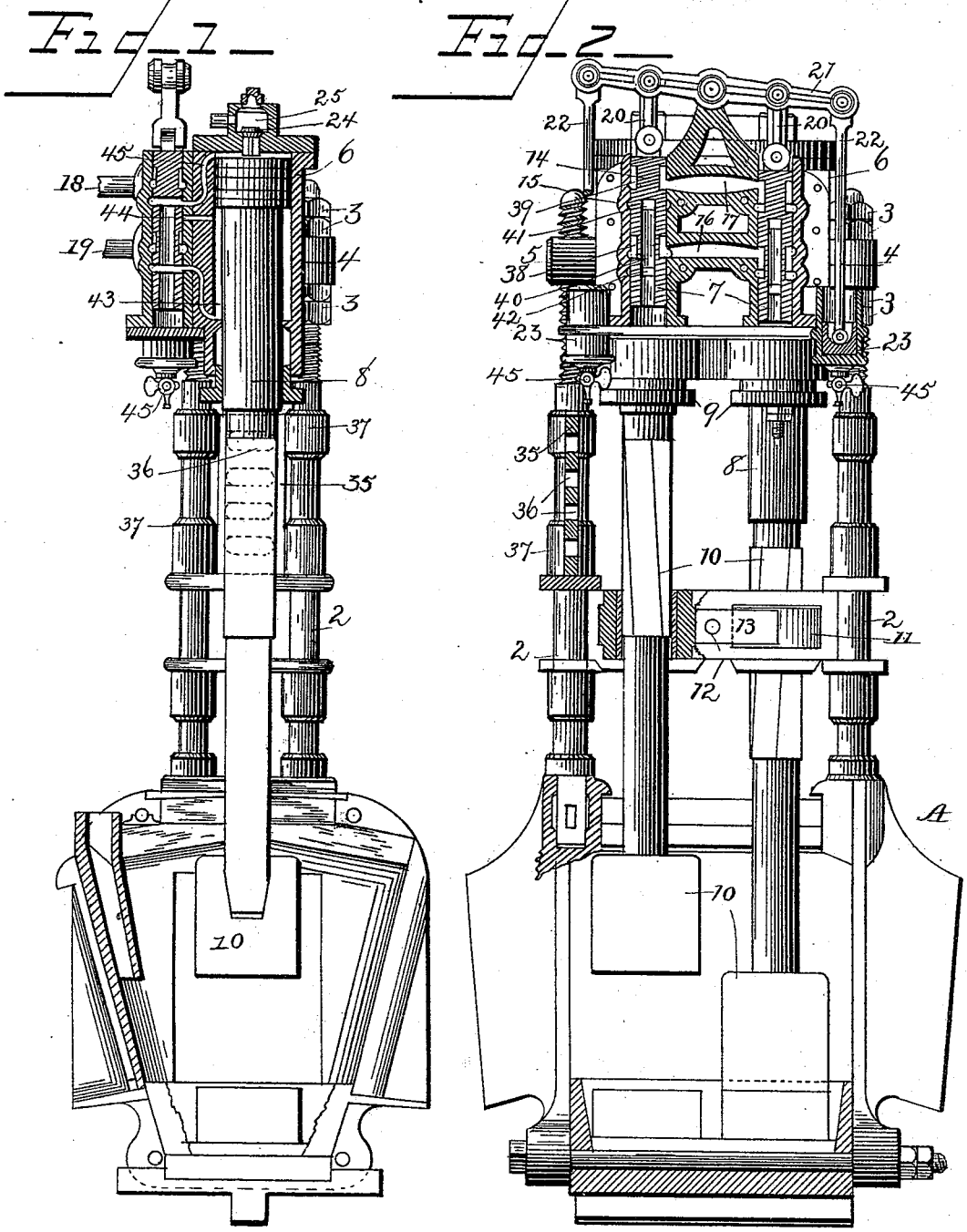

C. W. TREMAIN.
STEAM STAMP.

No. 515,380. Patented Feb. 27, 1894.

Witnesses
Thos. E. Robertson
Milton A. White.

Inventor
Charles W. Tremain
By T. J. W. Robertson
Attorney

UNITED STATES PATENT OFFICE.

CHARLES W. TREMAIN, OF PORTLAND, OREGON.

STEAM-STAMP.

SPECIFICATION forming part of Letters Patent No. 515,380, dated February 27, 1894.

Application filed June 19, 1891. Serial No. 396,861. (No model.)

*To all whom it may concern:*

Be it known that I, CHARLES W. TREMAIN, a citizen of the United States, residing at Portland, in the county of Multnomah and State of Oregon, have invented certain new and useful Improvements in Steam-Stamps, of which the following is a specification, reference being had therein to the accompanying drawings.

This improvement relates to that class of stamps shown in my Patent No. 436,027, and the invention consists in the peculiar construction, arrangement and combinations of parts, hereinafter more particularly described and then definitely claimed.

Figure 3:
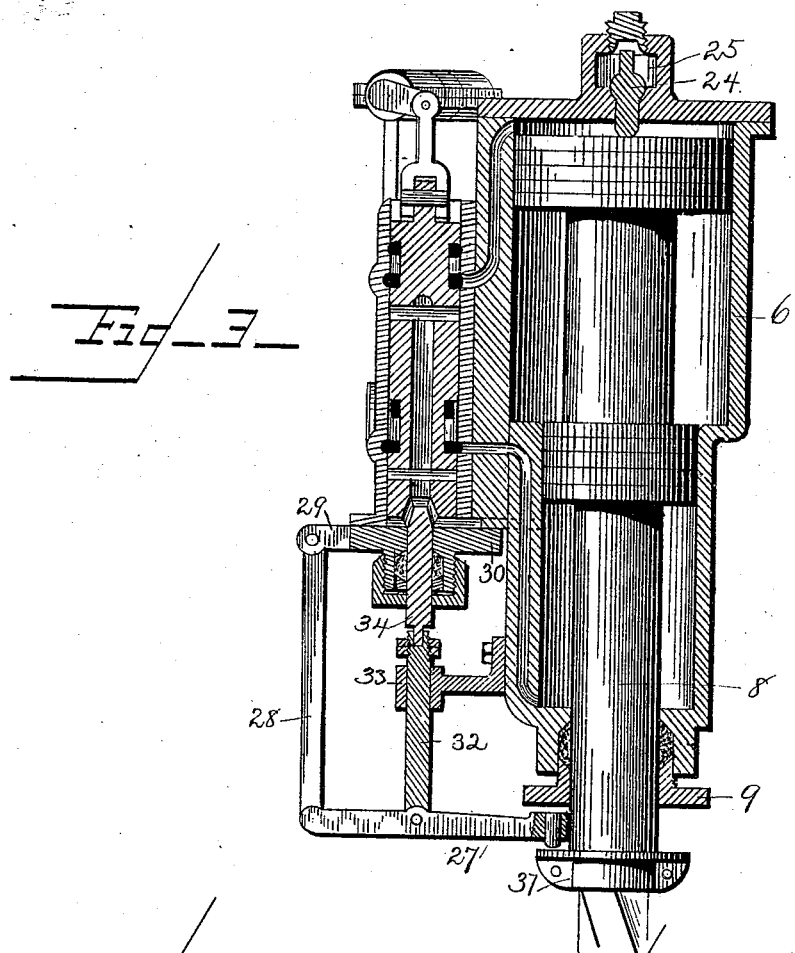
Figure 4:
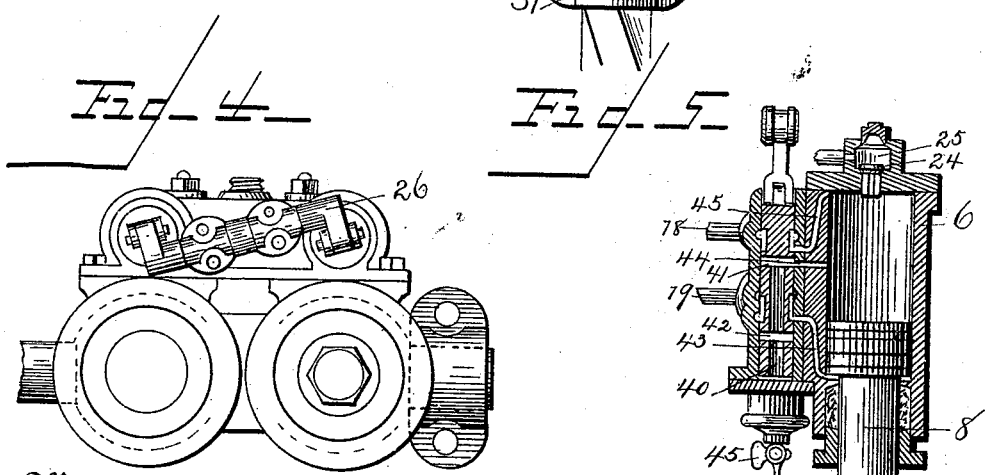
Figure 5:
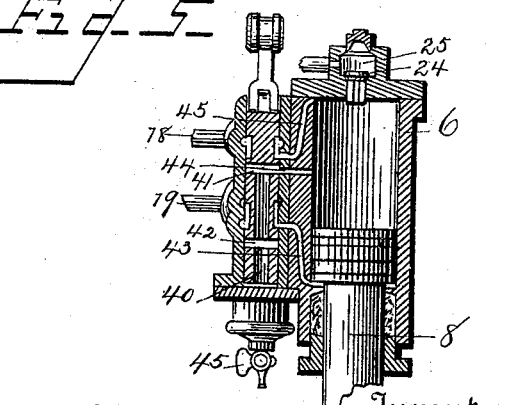

In the accompanying drawings—Figure 1 represents a vertical transverse section through the line x x in Fig. 2. Fig. 2 represents a front view with parts broken away; Fig. 3, a similar section to that shown in Fig. 1 of a modification; Fig. 4, a plan showing a modification of the connection between the valves. Fig. 5 is a vertical sectional view showing the piston at its lowest point, and the valve admitting steam below it.

Referring now to the details of the drawings—A represents the base of the ordinary or any suitable form, from which rise four standards 2, whose upper ends are threaded to receive nuts 3, between which are the pillow blocks 4, which form bearings for the trunnions 5, preferably cast with the cylinders 6. In each of these cylinders is a piston 7 having a stem 8, which works through the stuffing box 9, and carries on its lower end a stamp 10, attached in the usual, or any suitable manner. The central parts of these stems are made spiral and polygonal, as shown at 10, and work through correspondingly shaped holes in ratchet wheels 11, set in cross-frame 12, supported on the standards 2. Attached to the center of this frame 12 is a spring 13, whose opposite ends engage with the teeth of the ratchet wheels.

At 14 are shown two cylindrical valves working in suitable steam chests 15, and having inlet ports 16 and exhaust ports 17 leading to suitable pipes 18 and 19, for the steam and exhaust pipes, respectively. Both of these valves are connected by links 20 to a lever, or walking beam 21, in such a manner that as one goes up, the other goes down. On the opposite ends of the lever 21 are links 22 carrying pistons on their lower ends working in cylinders 23.

At the upper end of the cylinder 6 is a valve 24 opening into a live steam chamber 25 and normally acting to keep the steam in chamber 25 out of the cylinder.

Instead of the levers shown in Figs. 1 and 2 for connecting the valves, a rock-shaft 26, like that shown in Fig. 4, may be used, as I consider these devices as equivalents of each other.

In Fig. 3 is shown a modification designed for very large stamps, in which are introduced other features for safety and efficiency. The cylinder 6 is enlarged at the upper end to a capacity of four or more times that of the lower end, permitting greater expansion and more economical results. In this case the stem has two pistons of different diameters working in the opposite ends of the cylinders, which ends have corresponding diameters to that of the pistons.

Fig. 3 also shows a device for operating the valves by a positive motion, consisting of a lever 27, pivotally connected by the link 28 to an arm 29 projecting from the head 30 of the valve case. This lever is operated by a collar 31 fast on the stem 8, and carries a slide 32 working through a guide 33 attached to the cylinder 6, as shown, and giving motion by the valve rod 34, which also acts on the lower end of the valve and raises it, should it stick, or fail to act from any cause.

Between each pair of standards 2, is a bracket frame 35, having perforations 36 and collars 37, through which collars pass the standards 2, and are secured by set screws, or other appropriate means. These frames strengthen the standards, and the perforations 36, will be found useful in raising the stamp, when there is no steam, by passing a bar through said perforation and using the bottom of the wall thereof as a fulcrum. Each of the valves has annular recesses 38 and 39, and a central passage 40, open entirely to the bottom but terminating near the top where there is a side opening 41, between which and the bottom is another side opening 42. In the side of the cylinders are formed passages 43, 44 and 45.

The operation is as follows: Supposing the parts to be in the position shown in Fig. 2, in which case steam is admitted to the bottom of the right hand cylinder and is being exhausted from the top. The steam passes into the annular recess 38, and from thence through the passage 43 under the piston, thus lifting the same to the highest point, and as soon as it passes the passage 44, steam enters the central passage 40 through the said passage 44 and side opening 41, and acting on the bottom of the valve, lifts the same to the top of its stroke, and through the medium of the lever 21, carries the valve on the opposite side downward, and at the same time cutting off the connection between the cylinder and the main steam and exhaust passages—the annular recesses 38 and 39 being in such a position as to cut off communication between them as shown in Fig. 1. While the valve is in this position, there is free communication between the top and bottom of the cylinder through the passage 43, lower side opening 41, central passage 40, upper side opening 42 and passage 45, so that steam readily passes from the lower side of the piston and, by expansion, acts to drive the piston and stem downward, so that I use the same stem for striking the blow that lifted the stamp. If, for any reason, either of the valves 14 should not rise at the proper time, the top of the piston would strike the valve 24, at the top of the cylinder, and by admitting steam, prevent damage. To prevent the valves 14 from striking the bottom of the chest too hard is the object of the piston working in cylinders 23, and cushioning on air, which is compressed in said cylinders, which compression may be regulated by the cocks 45. The object of the polygonal stems is to give the stems a slight rotary motion to prevent wear. As the stems travel in one direction, they turn the ratchet wheels slightly, and as they travel in the other direction, the spring prevents the ratchet wheels turning, and thus the stems and stamps are bound to turn at each stroke. From the above it will be seen that I have produced a steam stamp of great power at a comparatively low cost, which will be very economical of steam, convenient in operation, and not likely to get out of order.

The peculiar adjustment of the cylinders by the trunnions, nuts, &c., will be found very useful in preventing wear on the glands, &c., and in adjusting the position of the cylinders as may be required by the wear of the stamps.

Some of the features above described and shown in the drawings are not herein claimed, as they form the subject matter of another application filed by me, as a division of this case, January 21, 1892, bearing the Serial No. 418,837. The salient points of these features are the following: first—the cushioning device in connection with the valves and their co-operating means; second—the peculiar construction of the piston valves and their connecting passages; third—the devices for supporting and adjusting the cylinders, and fourth—the devices for rotating the stamps and pistons. Other features connected with the construction of the battery, are also partially shown in this case but not claimed herein, and are fully shown, described and claimed in another application filed by me January 23, 1892, and bearing the Serial No. 419,062.

What I claim as new is—

1. In a steam engine, the combination with two cylinders, of a piston in each cylinder, a valve for each cylinder, a walking-beam or rock-shaft connecting said valves, and ports for admitting steam between the heads of the valve-chambers and the adjacent ends of the valves for actuating the latter in one direction, substantially as set forth.

2. In a steam engine, the combination with two cylinders and pistons therein, of a valve-chest for each cylinder, a piston-valve in each valve-chest, each piston-valve having two annular grooves, a rock-shaft connecting said piston-valves, and steam-ports for admitting steam to the valve-chests near one end of the latter for actuating the valves in one direction, substantially as set forth.

3. In a steam-engine, the combination with two cylinders and pistons therein, of a valve-chest for each cylinder, two pipes connecting said valve-chests, an inlet pipe communicating with one of said connecting-pipes and an exhaust-pipe communicating with the other connecting pipe, valves in said valve-chests, a rock-shaft connecting said valves, and means for operating said valves substantially as set forth.

4. In a steam-engine, the combination with two cylinders and pistons, of a valve-chest for each cylinder, said cylinders being provided with ducts connecting the ends of the cylinders with the valve-chests, and each cylinder being provided with a duct adapted to connect the cylinders and valve-chests in proximity to the upper ends of the latter, and piston-valves in said valve-chests, substantially as set forth.

5. In a steam-engine, the combination with two cylinders and pistons, therein, of valve-chests for said cylinders, piston-valves in said valve-chests, a link connected to each valve, a rock-shaft pivoted at its center and connected at its ends to said links and means for operating said valves, substantially as set forth.

6. In a steam-engine, the combination with two cylinders and pistons therein, of a valve-chest for each cylinder, each valve-chest being provided with annular recesses, pipes connecting said valve-chests and communicating with said recesses, a piston-valve in each valve-chest, a rock-shaft connecting said piston-valves and steam ports for admitting steam to the valve-chests near one end of the latter for actuating the valves in one direction, substantially as set forth.

7. The combination of two cylinders and pistons, two valves therefor, and connections, substantially as described, between the two valves, whereby one valve operates the other, as set forth.

8. The combination of two cylinders and pistons, two valves therefor, and a lever pivoted between them and connected to said valves, substantially as described.

9. The combination with a steam cylinder and a piston working therein, of a hollow piston valve therefor open at one end and closed at the other, and operated by the direct action of the steam, and a valve chest in which the valve works, having a passage for the steam from the main cylinder leading to it and communicating with the interior of the hollow piston, and its mouth in the cylinder arranged to be opened and closed by the motion of the piston, substantially as described.

In testimony whereof I affix my signature, in presence of two witnesses, this 9th day of April, 1891.

CHARLES W. TREMAIN.

Witnesses:
J. D. COLEMAN,
A. F. GARTNER.